United States Patent [19]

Boutin et al.

[11] 4,222,774

[45] Sep. 16, 1980

[54] ALUMINUM ALLOY

[75] Inventors: Francois-Regis Boutin, Virieu-sur-Bourbre; Michel Deleuze, Annecy; Daniel Marchive, Voiron; Rene Reze, Castelsarrasin, all of France

[73] Assignee: Cegecur Societe de Transformation de l'Aluminium Pechiney, Annecy, France

[21] Appl. No.: 14,710

[22] Filed: Feb. 23, 1979

[30] Foreign Application Priority Data

Mar. 20, 1978 [FR] France .................................. 78 08833

[51] Int. Cl.$^3$ ............................................. C22C 21/02
[52] U.S. Cl. ........................................ 75/148; 75/142; 75/143; 75/147; 148/31.5
[58] Field of Search ................. 75/148, 138, 142, 143, 75/147; 148/31.5

[56] References Cited

U.S. PATENT DOCUMENTS 1,579,481  4/1926  Hybinette .............................. 75/138

*Primary Examiner*—R. Dean
*Attorney, Agent, or Firm*—McDougall, Hersh & Scott

[57] ABSTRACT

An aluminum alloy for use in the production of enameled articles or articles subjected to elevated temperature having the following composition (% by weight):

| | |
|---|---|
| Mn | 0.9 to 1.5 |
| Si | 1.0 to 1.5 |
| Cr | 0.05 to 0.2 |
| Mg < | 0.2 |
| Cu < | 0.2 |
| Fe ≧ | 0.4 |
| Ni ≧ | 0.05 |
| Fe + Ni + Co | 0.8 to 2 | remainder aluminum and normal impurities.

6 Claims, No Drawings

ALUMINUM ALLOY

This invention relates to a Si-Mn aluminum alloy which has improved characteristics during and after exposure to elevated temperature and which is eminently suitable for enameling and for other baking treatments.

The aluminum-manganese alloys, in particular alloy No. 3003 according to the designation given by the Aluminum Association, are used for the production of enameled articles. Its rigidity after annealing is better than that of aluminum 1050 (99.5% aluminum) but the durability of the enamel deposited during service, measured by the SPALL TEST in accordance with ASTM C 486, is insufficient and, moreover, the resistance of finished products, for example saucepans, to blistering is not satisfactory. In addition, the mechanical characteristics of 3003 deteriorate at elevated temperature.

The alloy according to the invention provides substantial improvement in mechanical characteristics over 3003 both when hot and after a thermal annealing or baking treatment of a coating and allows improved serviceability of the enamel deposited when it is used for the production of enameled articles.

This alloy is composed of (in percent by weight);

| Mn | 0.9 | to | 1.5 |
|---|---|---|---|
| Si | 1 | to | 1.5 |
| Cr | 0.05 | to | 2 |
| Mg | <0.2 | | |
| Cu | <0.2 | | | and contains Fe in a quantity greater than or equal to 0.4, nickel in a quantity greater than or equal to 0.05%, with Fe+Ni+Co between 0.8 and 2, any other elements being in a total quantity of less than 0.2%, the remainder being aluminum. The addition of silicon contributes to good rigidity in the annealed state and does not have the disadvantage of magnesium additions which is unfavorable toward the serviceability of the layer of enamel except for carrying out a chromium-plating treatment which is not allowed for culinary articles. In addition to their actual metallurgical role in the alloy, the elements in the Fe, Ni, Co group favorably influence the adhesion of the enamel.

The properties of the enamel are particularly valuable when it is used in the cold-worked quarter hard state (H12 state according to French Standard NF A 02-006). In this case, in fact, the yield stress and the tensile stress are clearly improved after exposure to heat without excessive reduction of elongation.

The alloy according to the invention can advantageously be used either for applications in which the metal is exposed to heat for a certain period or at repeated intervals, for example, for exhaust chambers for road vehicles, heat exchangers, in particular, car radiators, drying cupboard walls, solar energy collectors, or for applications in which the metal has to undergo an enameling, lacquering, varnishing, non-stick coating treatment, etc.

The properties of the alloy according to the invention will be illustrated by the following examples which are given by way of illustration and not by way of limitation.

EXAMPLE 1

An alloy having the following composition (percent by weight):

| Mn | 1.14 |
|---|---|
| Si | 1.23 |
| Fe | 0.71 |
| Ni | 0.76 |
| Cr | 0.15 |
| Cu | <0.01 |
| Mg | <0.01 |
| Ti | <0.02 | remainder aluminum was cast semi-continuously in the form of a plate measuring 70×380×1000 mm. The plate was heated for 8 hours at 500° C., hot rolled to 12 mm, then cold rolled to 3 mm and annealed for 6 hours at 450° C. The mechanical characteristics (yield stress R 0.2, tensile stress Rm and elongation A) were measured (a) in the annealed state, (b) after enameling, baking being carried out at 560° C. with a rise in temperature over 30 mn, maintained for 10 minutes and cooling in calm air, (c) after coating with polytetrafluoroethylene (PTFE) without enameling, (d) after enameling on one face and coating with polytetrafluoroethylene on the other face.

The results are set forth in the following in Table I and compared with the results obtained under the same conditions with a 3003 alloy of the following composition:

| Mn | 1.15 |
|---|---|
| Si | 0.21 |
| Cu | 0.11 |
| Fe | 0.56 |
| Cr | 0.02 |

Table I

| | Annealed State | | | After enameling | | |
|---|---|---|---|---|---|---|
| | R 0.2 MPa | RM MPa | A % | R 0.2 MPa | Rm MPa | A % |
| Alloy according to the invention | 75 | 164 | 30 | 68 | 172 | 26.5 |
| 3003 | 42 | 117 | 43.3 | 41 | 121 | 47.1 |

| | After PTEE | | | Enameling + PTFE | | |
|---|---|---|---|---|---|---|
| | R 0.2 MPa | Rm MPa | A % | R 0.2 MPa | Rm MPa | A % |
| Alloy according to the invention | 68 | 164 | 30.6 | 68 | 166 | 28.7 |
| 3003 | 44 | 116 | 41 | 43 | 120 | 42.2 |

A very substantial increase is observed in the mechanical tensile characteristics and satisfactory elongation is maintained. The durability of the enamel was determined by a bending test. The sample is firstly pickled for 5 minutes in a bath containing 5% of trisodium phosphate brought to 70 to 75° C., rinsed, dried and dipped into a frit. The sample is dried in a drying cupboard at 150° to 170° C. before being brought to 560° to 570° C. for 10 minutes.

Once the samples have been cooled, the sheet metal is folded on itself and is compared to standard samples (5 qualities). The sample produced with the alloy according to the invention corresponds to the best quality, i.e., the metal is still completely covered with the enamel, while the sample produced with 3003 exhibits small patches where the enamel has burst.

EXAMPLE 2

A plate measuring 800×300×1580 mm made of an alloy having the following composition (percent by weight):

| | |
|---|---|
| Mn | 1.13 |
| Si | 1.22 |
| Fe | 0.67 |
| Ni | 0.80 |
| Cr | 0.15 |
| Ti | 0.02 |
| Cu | <0.01 |
| Mg | <0.01 | was cast semi-continuously. After heating for 8 hours at 500° C., hot rolling to 9 mm and cold rolling to 3 mm, a proportion of the metal was annealed for 7 hours (0 state) at 450° C., while another proportion was annealed for 9 hours at 460° C. then subjected to additional cold rolling to bring the thickness from 3 to 2.7 mm (H12 state).

The following characteristics are thus obtained:

Table II

| | Before enameling | | | After enameling | | |
|---|---|---|---|---|---|---|
| | R 0.2 MPa | Rm MPa | A % | R 0.2 MPa | Rm MPa | A % |
| 0 state | 88 | 152 | 29.4 | 65 | 153 | 25.0 |
| H12 state | 151 | 171 | 12.5 | 84 | 159 | 22.6 |

It is observed that in the H12 state, after enameling, the yield stress is greatly improved without the elongation diminishing significantly. One is thus provided with an additional means of improving the characteristics after exposure to elevated temperature while retaining the metal's eminent suitability for cold working.

Finally, the mechanical characteristics in heat of the above-mentioned alloy in the zero state and in the H12 state and of the 3003 alloy mentioned in Example 1 were compared after been maintained for 100 hours at the test temperature.

These results are compiled in Table III.

Table III

| Test Temperature | | 20° C. | | | 150° C. | | | 250° C. | | |
|---|---|---|---|---|---|---|---|---|---|---|
| Alloy state | | R 0.2 MPa | Rm MPa | A % | R 0.2 MPa | Rm MPa | A % | R 0.2 MPa | Rm MPa | A % |
| According to the invention | 0 | 75 | 164 | 30 | 57 | 99 | 52 | 40 | 60 | 54 |
| | H12 | 151 | 171 | 13 | 98 | 112 | 24 | 71 | 83 | 25 |
| 3003 | 0 | 41 | 110 | 40 | 35 | 77 | 47 | 25 | 44 | 65 |

It will be observed that, in the annealed state, the alloy according to the invention has mechanical characteristics in heat which are clearly improved over those of the 3003 alloy. In addition, the use of products in the H12 state further improves these characteristics.

EXAMPLE 3

Plates having a cross-section of 1120 mm×250 mm, made of alloy having the following composition (percent by weight):

| | |
|---|---|
| Mn | 1.02 |
| Si | 1.00 |
| Fe | 0.68 |
| Ni | 0.45 |
| Cr | 0.13 |
| Ti | 0.01 |
| Cu | <0.01 |
| Mg | <0.01 | which had been skinned, heated for 12 hours at 600° C., hot rolled at 12 mm, then cold rolled to 3 mm and annealed at 450° C. for 6 hours (2 hours at the maintenance temperature), were cast semi-continuously.

The mechanical characteristics were then measured in the annealed state, after enameling and after enameling + PTFE coating, carried out under the same conditions as those employed in Example 1. The results obtained are as follows:

Table IV

| Annealed State | | | After enameling | | | After enameling + PTFE | | |
|---|---|---|---|---|---|---|---|---|
| R 0.2 MPa | Rm MPa | A % | R 0.2 MPa | Rm MPa | A % | R 0.2 MPa | Rm MPa | A % |
| 81 | 145 | 24 | 90 | 151 | 22 | 79 | 145 | 25 |

These characteristics are significantly better than those of the 3003 alloy (see Table I).

EXAMPLE 4

An alloy of the following composition (percent by weight):

| | |
|---|---|
| Mn | 1.00 |
| Si | 1.10 |
| Fe | 0.73 |
| Ni | 0.14 |
| Cr | 0.15 |
| Ti | 0.01 |
| Cu | <0.01 |
| Mg | <0.01 | was transformed under the same conditions as those employed in Example 3. The sheets obtained in the annealed state (0 state) were hot tensile tested after a residence of 100 hours at the test temperature. The results obtained are shown in Table V below, compared to the results obtained for the 3003 alloy in the same 0 state.

Table V

| Test Temperature | 20° C. | | | 150° C. | | | 250° C. | | |
|---|---|---|---|---|---|---|---|---|---|
| Alloys | R 0.2 MPa | Rm MPa | A % | R 0.2 MPa | Rm MPa | A % | R 0.2 MPa | Rm MPa | A % |
| According to the invention 0.14% Ni | 49 | 146 | 34 | 47 | 121 | 44 | 39 | 85 | 47 |
| 3003 | 41 | 110 | 40 | 35 | 77 | 47 | 25 | 44 | 65 |

It is observed that the presence of nickel is clearly favorable toward the obtainment of good mechanical characteristics in heat relative to the 3003 alloy.

We claim:

1. An aluminum alloy consisting essentially of the following composition (percent by weight):

| | |
|---|---|
| Mn | 0.9 to 1.5 |
| Si | 1.0 to 1.5 |
| Cr | 0.05 to 0.2 |
| Fe ≧ | 0.4 |
| Ni ≧ | 0.05 |
| Fe + Ni + Co | 0.8 to 2 |
| Mg < | 0.2 |
| Cu < | 0.2 | any other elements in a total quantity of less than 0.2, with the remainder aluminum.

2. An aluminum alloy base having a baked coating of enamel, lacquer, varnish or a non-stick product, in which the aluminum base is an aluminum alloy as claimed in claim 1.

3. Heat exchanger formed of an aluminum alloy of claim 1.

4. Exhaust chambers for road vehicles formed of an aluminum alloy as claimed in claim 1.

5. Solar energy collector formed of an aluminum alloy of claim 1.

6. Cupboard walls formed of an aluminum alloy of claim 1.